Nov. 2, 1965

C. R. GIBBONS 3,215,066

CAN MARKING MACHINE

Filed July 29, 1963

INVENTOR.
CHESTER R. GIBBONS
BY
*W.B. Haupman*
ATTORNEY

Nov. 2, 1965   C. R. GIBBONS   3,215,066
CAN MARKING MACHINE
Filed July 29, 1963   11 Sheets-Sheet 2

INVENTOR.
CHESTER R. GIBBONS
BY W. B. Harpman

INVENTOR.
CHESTER R. GIBBONS
BY W. B. Harpman
ATTORNEY

Nov. 2, 1965  C. R. GIBBONS  3,215,066
CAN MARKING MACHINE
Filed July 29, 1963  11 Sheets-Sheet 4

INVENTOR.
CHESTER R. GIBBONS
BY
*W. B. Harpman*
ATTORNEY

Nov. 2, 1965   C. R. GIBBONS   3,215,066
CAN MARKING MACHINE
Filed July 29, 1963   11 Sheets-Sheet 5

INVENTOR.
CHESTER R. GIBBONS
BY
W. B. Harpman
ATTORNEY

INVENTOR.
CHESTER R. GIBBONS
BY
ATTORNEY

FIG. 20

INVENTOR.
CHESTER R. GIBBONS
BY
*W. B. Harpman*
ATTORNEY

United States Patent Office 3,215,066
Patented Nov. 2, 1965

1

3,215,066
CAN MARKING MACHINE
Chester R. Gibbons, Guide Bldg., Canfield, Ohio
Filed July 29, 1963, Ser. No. 298,313
9 Claims. (Cl. 101—41)

This invention relates to a can marking machine and more particularly to a machine which will receive half cases of canned goods and simultaneously price mark each of the cans in the half case rapidly and efficiently.

The principal object of the invention is the provision of a can marking machine that will apply price markings to the ends of cans such as those in which food products are packed.

A further object of the invention is the provision of a can marking machine which provides for the ready interchange of the indicia marking portions thereof so that various prices may be marked by the machine.

A still further object of the invention is the provision of a can marking machine that accepts half cases of canned goods and simultaneously marks each of the cans in the half cases.

A still further object of the invention is the provision of a can marking machine providing rapid, efficient and positive marking of a multiplicity of cans in groups such as in half cases or the like.

The can marking machine disclosed herein comprises a device for automatically and accurately and rapidly marking price information on the ends of cans such as used in packaging food stuffs and the like. In current marketing practice, most such canned goods are hand marked by stock boys and placed on the shelves of the so-called supermarkets from whence they are removed by the customer. The pricing information on the cans is necessary to enable the cashiers at the check-out counters in the supermarket to total up the customer's bill. Considerable time and effort is devoted to opening the cases of canned goods, price marking the ends of the cans and then placing the cans on the shelves.

The present machine eliminates a great deal of this work and the time necessary therefor by simultaneously and accurately price marking the ends of all of the cans in a single layer case or half of the cans in a two-layer case. When the cans are packed in a single layer case, which occurs infrequently, the top of the case is removed to provide access to the tops of the cans and the case containing the cans is then positioned in the can marking machine where each of the cans are automatically marked and the case delivered by the machine. When the cans are packed in a double layer case, the case is cut mid-way between its upper and lower portions and opened book-like to present the two half cases in which the cans are still positioned. These half cases are fed through the can marking machine and the cans rapidly and accurately marked. Different prices on different cans of different food stuffs and the like require that the indicia carrying portions of the can marking machine be interchangeable and the can marking machine disclosed herein provides for the ready interchange of indicia carrying plates which provide a wide range of price marking indicia carrying devices. The can marking machine disclosed herein is arranged so that it receives, positions, moves and elevates the case of canned goods into marking engagement with suitable indicia marking means, lowers the case and delivers it from the machine in a single rapid operation.

2

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawings, wherein.

Figure 1:
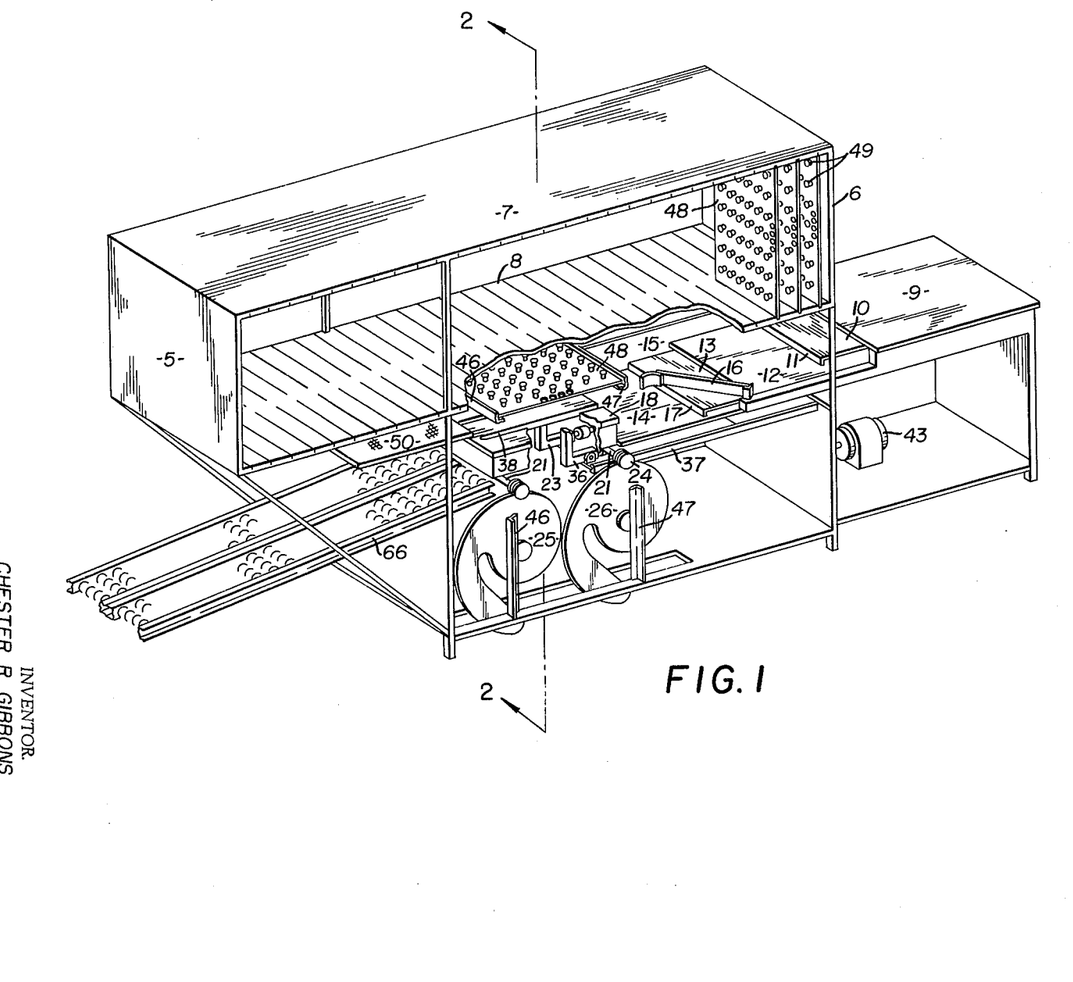
FIGURE 1 is a perspective view of the can marking machine showing portions broken away and portions in cross section.

By referring to the drawings and FIGURE 1 in particular, it will be seen that a machine for price marking canned goods has been disclosed and which machine incorporates novel feeding, placing and marking apparatus. In FIGURE 1 of the drawings a feed table 9 is formed in the righthand side of the machine upon which cartons of canned goods to be marked are placed and opened. Cartons having one layer of cans therein have their tops removed before being fed into the machine and cartons having two layers of cans therein are cut half way between their top and bottom portions and opened booklike so that the opposed ends of the two rows of cans are upright, while remaining in the carton halves. The cartons are then moved manually from the feed table to the left to a first sliding platform 10, having a flange 11 on its forward edge, or to a fixed platform 12 and eventually onto a second sliding platform 13 from which they drop onto a feed bed 14 being simultaneously straightened and aligned against the back guide wall 15 of the machine by a spring guide member 16. The cartons are subsequently pushed off the feed bed 14 by the flanged forward edge of the second sliding platform 13, the flange thereon being indicated by the numeral 17. The cartons are moved onto an elevator platform 18 which is supported on a pair of spaced vertically positioned telescopic guide members 19 and 20 (see FIGURES 18 and 19). Horizontal shafts 21, and 22 on the elevator 18 have annular grooved rolls 23 and 24 which are on engaged cams 25 and 26 respectively which are so formed as to be able to impart vertical motion to the rolls 23 and 24, the cams 25 and 26 being revolvable more than 180°. The cams 25 and 26 are mounted on cam shafts 27 and 28 and driven simultaneously by chains 29 and 30 trained over sprockets 31 and 32 on the cam shafts 27 and 28 and over sprockets 33 on a transmission unit 34 which in turn is driven by an electric motor 35 all as disclosed in FIGURES 2, 3, 18 and 19 of the drawings.

Figure 2:
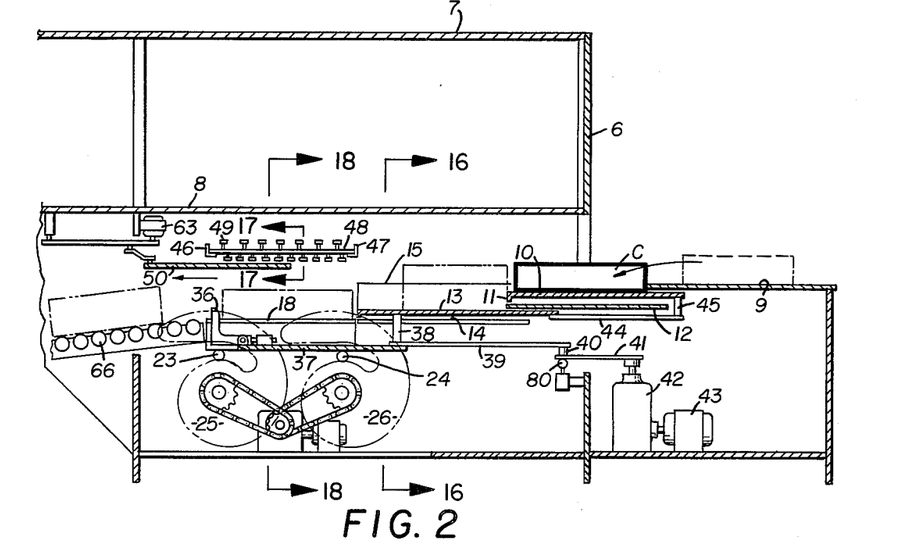
FIGURE 2 is a vertical section on line 2—2 of FIGURE 1 showing the initial stage of operation of the machine with respect to a specific case of cans to be marked.
Figure 3:
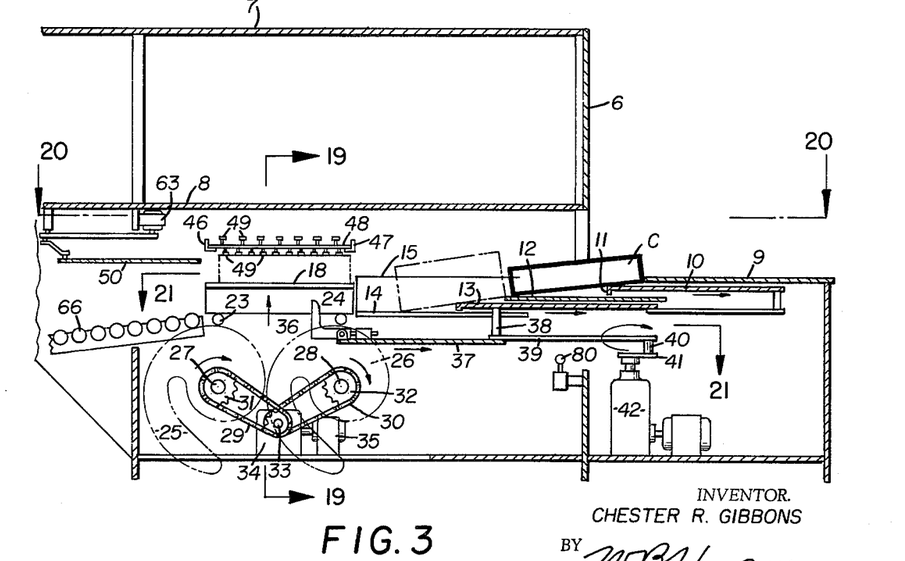
FIGURE 3 is a section similar to FIGURE 2 showing a subsequent operational step.

The elevator platform 18 is slotted longitudinally inwardly from its right end which is adjacent the feed bed 14 and a plurality of L-shaped arms 36, 36 are pivoted to the reciprocating frame 37 of the machine and arranged so that the vertical portions of the L-shaped arms 36, 36 register with the longitudinal slots 18A in the elevator platform 18. The reciprocating member 37 is mounted in the machine for movement longitudinally thereof; that is, from left to right as seen in FIGURES 1, 2, and 3 of the drawings, and is connected by a vertical member 38 with the second sliding platform 13 so that the reciprocating member 37 and the second sliding platform 13 will move simultaneously as occasioned by an actuating arm 39 (see FIGURE 21) which in turn is pivoted by a pivot 40 to the end of a crank arm 41 mounted on a gear box 42 and driven by an electric motor 43. The first sliding platform 10 is connected to the second sliding platform 13 by horizontal and vertical links 44 and 45 respectively so that the motion of the sliding platforms 10 and 13 is simultaneous.

By referring again to FIGURE 1 of the drawings, it will be seen that a pair of horizontally disposed spaced support members 46 and 47 are positioned in the machine above the elevator platform 18 and arranged to support the indicia carrying plate 48 which is one of a plurality of such plates conveniently stored in a rack formed in the upper portion of the machine and comprising a slotted bottom portion 8 and an oppositely disposed slotted top portion 7. The horizontal supports 46 and 47 have downturned outer ends carrying the same on the lower side portions of the can marking machine. The rack is provided with right and left end walls 6 and 5 respectively and is of a size permitting two parallel rows of the plates 48 to be positioned therein as best seen in FIGURE 1 of the drawings. Each of the plates 48 has a plurality of resiliently mounted indicia carrying members 49 thereon arranged in patterns matching the arrangement of canned goods in cases. For example, a case of canned goods having two layers of twenty-four cans on each layer requires a plate 48 having twenty-four resiliently mounted indicia carrying marking members 49; whereas a case having one layer of forty-eight cans requires a plate having forty-eight resiliently mounted indicia carrying marking members 49. Each of the plates 48 is so arranged that it has a different group of indicia carrying marking members 49 on its opposite sides being different either in the number and pattern and/or in the price shown by the marking members.

By referring again to FIGURES 1, 2 and 3 of the drawings, it will be seen that the plate in position on the spaced support members 46 and 47 has a different arrangement and pattern of marking members 49 on its lower side than on its upper side. It is thus possible to provide a sufficient number of the plates 48 to take care of the various sizes of cases and arrangement of cans therein and also the different price variations shown on the individual marking members 49 so that the machine may be used to price mark all of the usual canned goods found in a supermarket.

Figure 18:
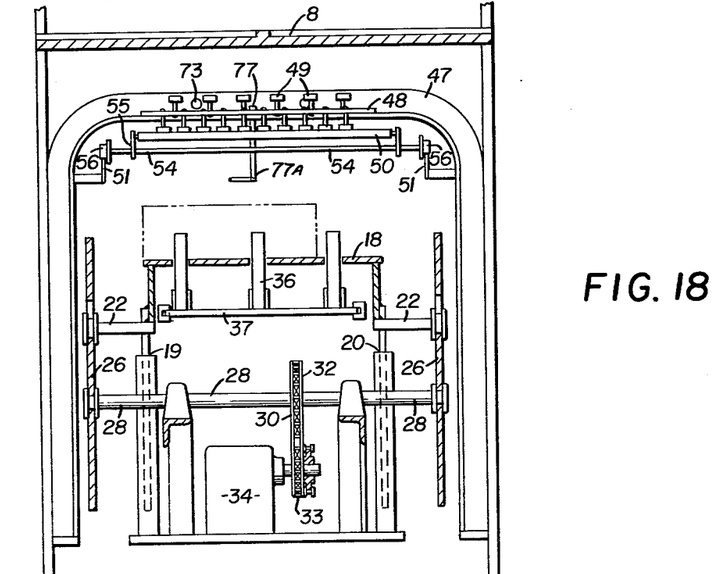
FIGURE 18 is a vertical section on line 18—18 of FIGURE 2.
Figure 19:
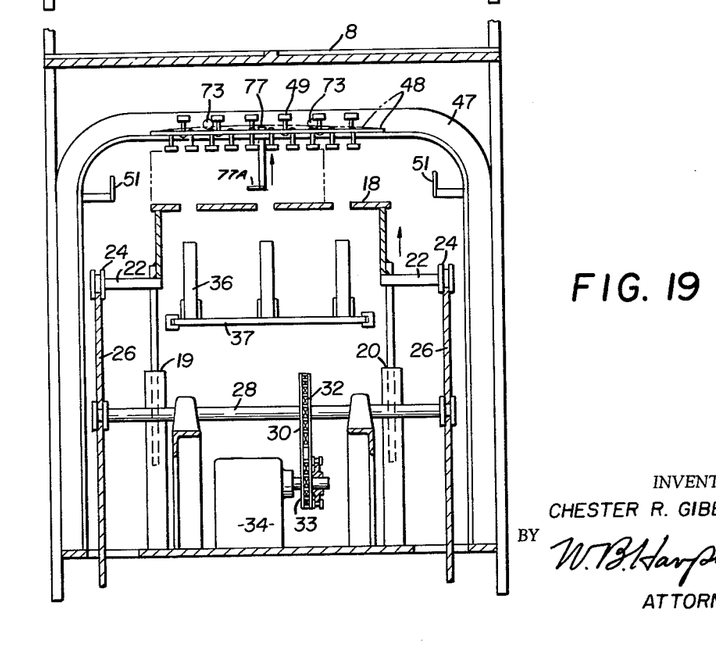
FIGURE 19 is a vertical section on line 19—19 of FIGURE 3.
Figure 20:
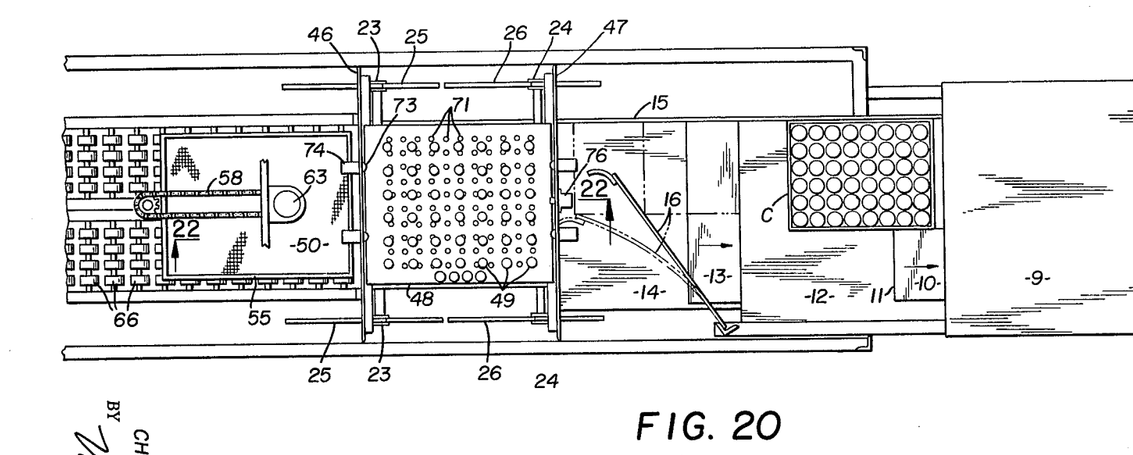
FIGURE 20 is a horizontal section on line 20—20 of FIGURE 3.
Figure 22:
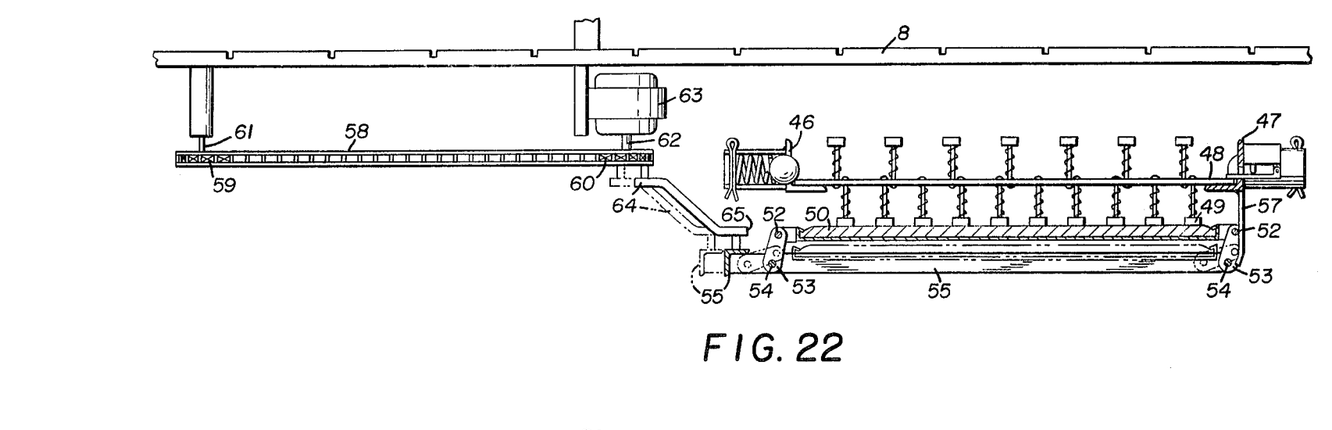
FIGURE 22 is a vertical section on line 22—22 of FIGURE 20 showing the inking mechanism in position relative to the printing mechanism.
Figure 23:
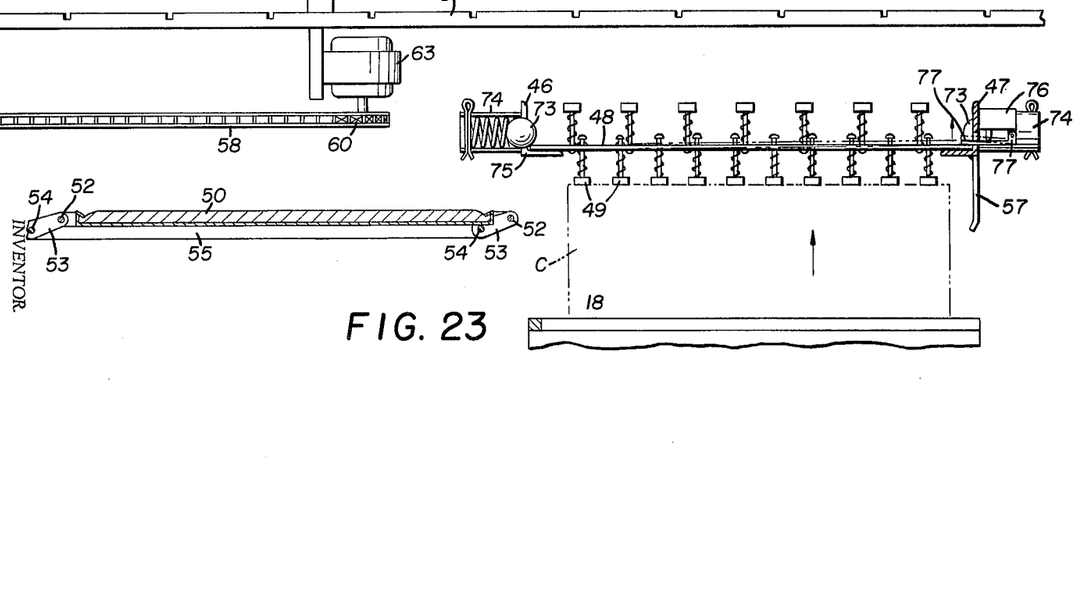
FIGURE 23 is a vertical section similar to FIGURE 22 showing the inking mechanism retracted relative to the printing mechanism.

Still referring to FIGURE 1 of the drawings, it will be seen that to the left of the plate 48 and the elevator platform 18 there is an inking pad 50 which is arranged between parallel guides 51, 51 (see FIGURE 18) for reciprocal movement into and out of the area between the elevator platform 18 and the plate 48. The apparatus for the inking pad 50 is best illustrated in FIGURES 22 and 23. By referring thereto, it will be seen that the inking pad 50 is supported at its opposite ends on a pair of transverse shafts 52, 52 which are in turn supported at their outer ends by links 53, 53 which are engaged at their lower-most ends to parallel shafts 54, 54 on a frame 55; the shafts 54, 54 as best seen in FIGURE 18 of the drawings extend outwardly beyond the sides of the frame 55 and are provided with flanged rollers 56, 56 which engage the parallel guides 51, 51 heretofore referred to. The horizontal support member 47 which supports the right edge of the plate 48 as seen in FIGURES 1, 22 and 23 of the drawings has a depending detent 57 which is positioned thereon for engagament with the forward end of the ink pad 50 (the right end as seen in FIGURE 22) so that when the ink pad 50 on its frame 55 is moved in under the plate 48 with its depending marking members 49, the transverse shaft 52 will strike the detent 57 and prevent further motion thereof while the frame 55 continues to move to the right relative thereto. The links 53 will thus elevate the inking pad 50 relative to the frame 55 and bring its upper inked surface into suitable contact with the marking members 49 so that ink is applied thereto. The frame 55 is moved reciprocably by a mechanism illustrated in FIGURES 20 and 22 which comprises an endless chain 58 trained over a pair of sprockets 59 and 60, which in turn are mounted horizontally on vertical shafts 61 and 62 in the frame of the can marking machine. The shaft 62 is also the shaft of an electric motor 63 so that the chain 58 can be moved thereby. A depending angular arm 64 is attached to the chain 58 and its lower outer end 65 is attached to the frame 55. The arm 64 is pivotally mounted on the chain 58 so that when the chain 58 completes one revolution about the sprocket 60 the inking pad 50 and its carrier frame 55 will move from a retracted position, as seen in FIGURES 1, 20 and 23 of the drawings, to a position beneath the plate 48 and its marking members 49, as shown in FIGURE 22 of the drawings. The inking pad will move upwardly as hereinbefore described so as to suitably ink the marking members 49 and then move downwardly and backwardly to retracted position. The machine is cycled so that this action occurs each time the elevator platform 18 moves downwardly to level off with the feed bed 14 where the L-shaped arms 36 project through the slots 18A and move to push the carton just marked off onto a conveyor 66.

By referring now to FIGURE 2 of the drawings, it will be seen that a carton of canned goods with its top removed is indicated in solid lines and the letter C and an arrow in FIGURE 2 indicates positioning of the carton of canned goods C on the sliding platform 10 from its initial position on the feed table 9. The machine is energized so that the electric motor 43 operates to cause reciprocal motion of the sliding platforms 10 and 13 and the electric motor 63 is operated by limit switches (not shown) engaged by the sliding platforms 10 and 13 so that it reciprocates the ink pad 50 as heretofore described.

The carton C of cans to be marked being located on the sliding platform 10 remains in position against the supporting edge of the feed table 9 as the platform 10 moves to the right in a retracting motion as indicated by the arrows in FIGURE 3 of the drawings. The electric motor 35, which operates to elevate the cams 25 and 26, is energized by a limit switch operated by the sliding platforms 10 and 13 and therefore causes the elevator platform 18 to operate in desirable cycling action relative to the rest of the machine. In FIGURE 2, the cams 25 and 26 are not moving.

In FIGURE 2 of the drawings, the elevator platform is in lowermost position, and in FIGURE 3 of the drawings the elevator platform 18 has moved upwardly responsive to the clockwise rotation of the elevator cams 25 and 26.

Figure 4:
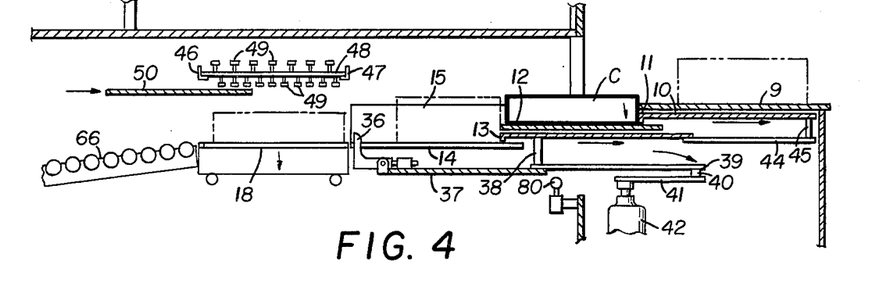
FIGURE 4 is a vertical section similar to FIGURE 3 showing a subsequent operational step in which the case motivating portions of the machine are retracted.
Figure 5:
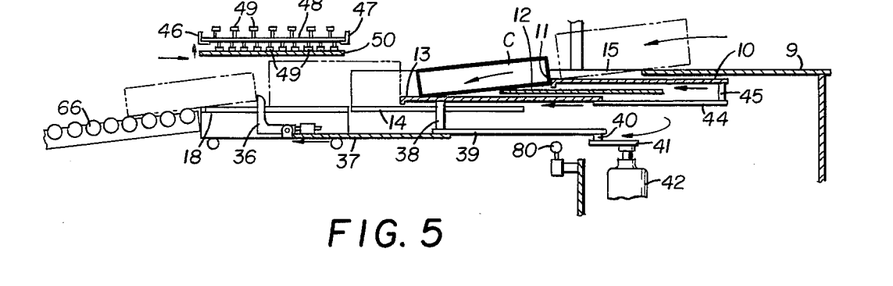
FIGURE 5 is a partial section similar to FIGURE 4 showing a subsequent operational step in which the case motivating portions of the machine are advancing the specific case toward the marking section.
Figure 6:
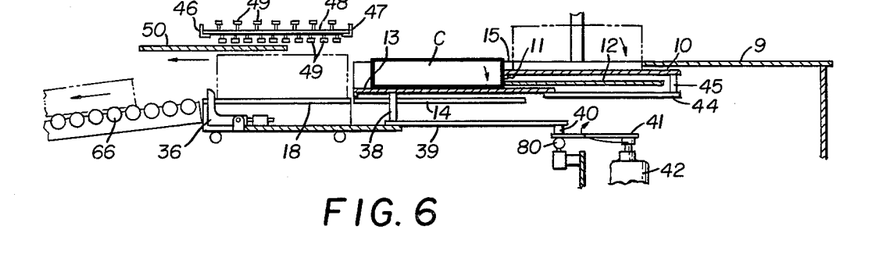
FIGURE 6 is a vertical section similar to FIGURE 5 in which the case motivating sections of the machine are advancing the specific case toward the marking section.

By referring now to FIGURE 4 of the drawings, the carton C of cans to be marked will be seen to have been deposited on the fixed platform 12 and in such position that the flange 11 on the forward end of the sliding platform 10 can now engage the carton C and move the same forwardly (to the left), and onto the sliding platform 13 as seen in FIGURE 5 of the drawings. Arrows in FIGURE 4 of the drawings indicate the motion of the carton C and the sliding platforms 10 and 13, which motion positions the carton C on the fixed platform 12.

Figure 7:
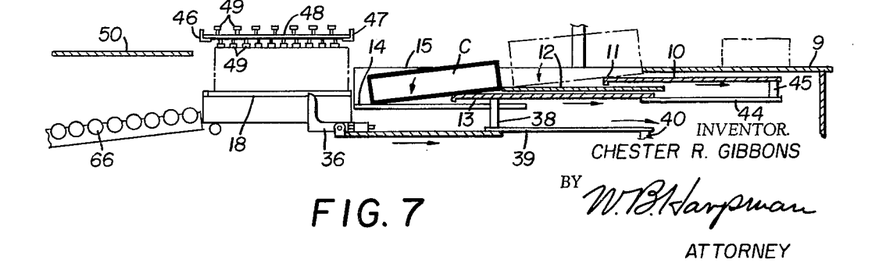
FIGURE 7 is a vertiacl section similar to FIGURE 6 in which the case motivating portions of the machine are retracting.

In FIGURE 5, the motion of the sliding platforms 10 and 13 is reversed and the carton C is pushed by the flange 11 onto the sliding platform 13 as indicated by the arrows in FIGURE 5. In FIGURE 2 of the drawings, the carton C of cans to be marked is shown in position on the sliding platform 13, and in FIGURE 7 the retracting movement of the sliding platforms 10 and 13 acts to drop the carton C of cans to be marked on the feed bed 14.

Figure 8:
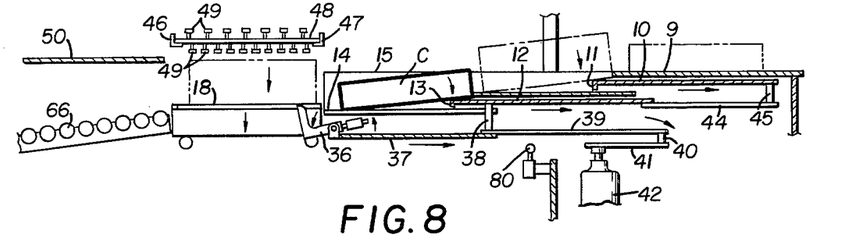
FIGURE 8 is a vertical section similar to FIGURE 7 in which the case motivating portions of the machine are retracting.
Figure 9:
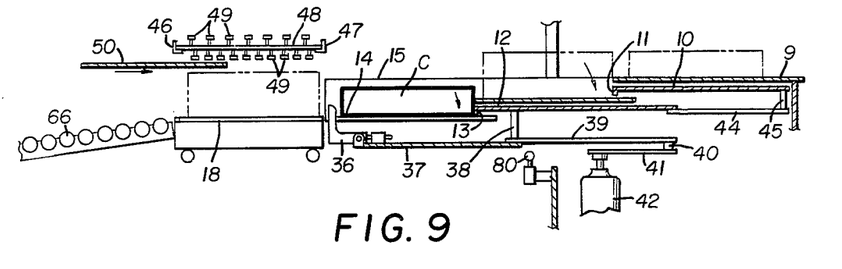
FIGURE 9 is a partial section similar to FIGURE 8 in which the case motivating portions of the machine are fully retracted, and the specific case has been moved into final feed position.
Figure 10:
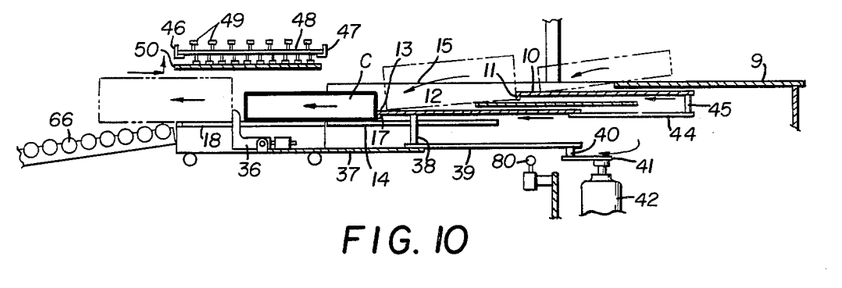
FIGURE 10 is a partial section similar to FIGURE 9 in which the case motivating portions of the machine are moving the specific case onto an elevator portion thereof.

In FIGURES 8 and 9 of the drawings, the carton C of cans to be marked is shown dropping onto the feed bed 14. In FIGURE 10 of the drawings, the flanged forward edges of the sliding platforms 13 and 10 are moving forward (to the left) and the flange 17 on the platform 13 pushes the carton C of cans to be marked onto the elevator platform 18.

Figure 11:
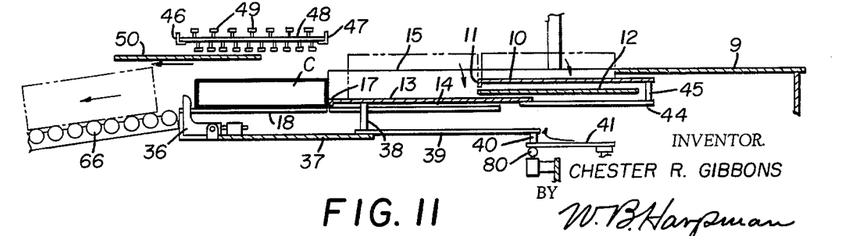
FIGURE 11 is a partial section similar to FIGURE 10 in which the case motivating portions of the machine have moved the specific case onto the elevator portion thereof.

It will be observed that the L-shaped arms 36 which are pivoted to the reciprocating member 37 move with the sliding platforms 10 and 13 so that if the carton C of cans to be marked moves onto the elevator platform 18, the L-shaped arms 36 move in advance thereof so as to push off the preceding carton, if any. In FIGURE 11, the carton C with cans to be marked is shown in position on the elevator platform 18, which is now stationary and in FIGURE 12, the elevator platform 18 is shown moved to elevated position wherein the carton C of cans to be marked has been moved upwardly so as to engage the cans therein on the marking members 49 thereby simultaneously applying price information to the ends of each of the cans in the carton. While the elevator platform 18 is in uppermost position, as just described, the reciprocating member 37 carrying the L-shaped arms 36 moves to the right as shown by the arrows and in FIGURE 13 the elevator platform 18 is shown moved to lowermost position in horizontal alignment with the feed bed 14 and the conveyer 66. It will thus be seen that the elevator platform 18 is stationary in lower position when cartons are moved onto or off of the same, as in FIGURE 2, and that it moves upwardly to upper position by clockwise rotation of the cams 25 and 26 as in FIGURE 3 or downwardly by counterclockwise motion of the cams 25 and 26 as in FIGURE 4. The cams 25 and 26 reverse direction by the reversal of the motor 35 as hereinafter explained.

Figure 14:
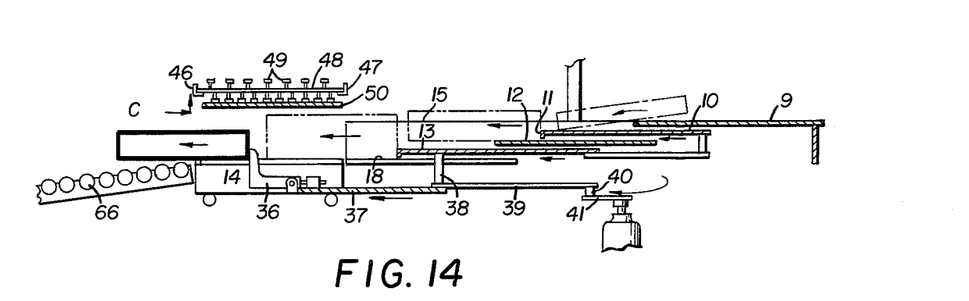
FIGURE 14 is a partial section similar to FIGURE 13 in which the case actuating portions of the machine are moving the specific case out of the machine.
Figure 15:
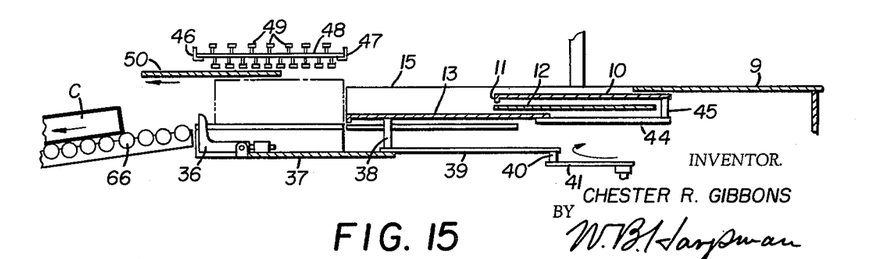
FIGURE 15 is a partial section similar to FIGURE 14 showing the specific case rolling out of the machine on a roller conveyer.

In FIGURE 14, the reciprocal member 37 moves to the left with the L-shaped arms 36 in engagement with the carton C of marked cans and pushes it off onto the conveyer 66 as seen in FIGURE 15. Throughout the series of drawings comprising FIGURES 2 through 15, broken illustrations of preceding and following cartons of cans to be marked may be seen in their respective places relative to the carton C which has been described. For example, in FIGURE 2 of the drawings, there are three cartons illustrated in broken line illustrations which are positioned respectively on the conveyer 66, the elevator platform 18 and the sliding platform 13, while in FIGURE 3 of the drawings, the broken line illustration of the carton on the elevator platform 18 is shown in printing position. The FIGURES 2 through 15 therefore follow one specific carton C through the several cycles of the machine which move the carton C and others before or after it progressively through the printing machine.

By referring now to FIGURES 1 and 20, it will be observed that the spring guide 16 is secured at its foremost end to a portion of the frame of the can marking machine and that its innermost end is positioned in spaced relation to the back wall guide 15. Broken lines in FIGURE 20 indicate the action of the spring guide 16 in holding a carton against the back wall guide 15 while it is advanced in the machine by the flanged sliding platforms 10 and 13 heretofore described.

By referring now to FIGURES 2 and 3 of the drawings, the position of the carton C moving under the control of the spring guide 16 may be seen. The marking of the individual cans in the carton, whether it is a half carton or a whole carton as hereinbefore described, is accomplished by the individual marking members 49, which are mounted on one side of the plate 48.

Figure 17:
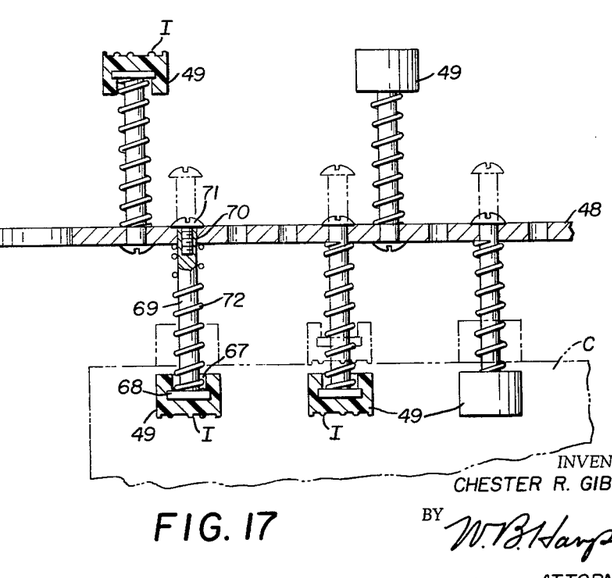
FIGURE 17 is an enlarged detail of a portion of one of the printing elements and the individual printing members thereof.

By referring now to FIGURE 17 of the drawings, an enlarged cross sectional detail of one of the plates 48 may be seen, and it will be observed that a plurality of the individual marking members 49, 49 are shown in depending relation thereto as well as in upstanding relation thereto. The price marking members 49 as shown in FIGURE 17 are arranged in closer proximity to one another so that smaller cans will be marked while the marking members 49 shown in upstanding position in FIGURE 17 are more widely spaced as for marking larger cans in their relatively larger spacing pattern. It will be seen that each of the individual marking members 49 comprises a resilient member having indicia I on its outermost surface, while its inner side has a flanged socket 67 therein which is snapped over a head 68 on a stem 69 which in turn is mounted in an opening 70 in one of the plates 48. A bolt 71 threaded into the end of the stem 69 secures the assembly and a coil spring 72 is positioned between the head 68 of the stem 69 and the plate 48; thus, resiliently mounting the assembly so that the action indicated in the lower part of FIGURE 17 in broken lines will occur when a carton C moves upwardly.

In connection with the actual printing of the desired indicia on the canned goods as just described, the can marking machine provides means insuring against jamming during the actual printing operation.

By referring to FIGURE 23, a carton C is shown in broken lines registering with the marking members 49 on the plate 48 and it will be observed that the plate 48 is resting on the horizontal portions of the spaced support members 46 and 47 and held in that position by spring urged detents 73, 73 which are mounted on the exterior sides of the horizontal portions of the support members 46 and 47 adjacent to housings 74, 74 and which cage coil springs 75 as will be understood by those skilled in the art. The support member 47 carries a micro-switch 76, one trigger arm 77 of which extends through an opening in the support member 47 and normally rests on top of the plate 48. Another trigger arm 77A extends downwardly and into position to be engaged by the elevator platform 18 when the same is in close spaced relation to the plate 48. The micro-switch 76 which is controlled by the trigger arms 77 and 77A is thereby responsive in operation to the vertical motion of the elevator platform when it has a carton of cans thereon to be marked and when no carton is present. The positioning of the trigger arm 77 also insures against damage to the mechanism from jamming as the lifting motion of the plate 48, when the carton C of cans to be marked moves against the marking members 49, controls the reversal circuits of the machine. Similarly, when the machine is actuated without a carton of cans to be marked on the elevator platform the trigger arm 77A is engaged by the elevator platform 18 before the same reaches the marking members 49 and the responsive action of the micro-switch 76 reverses the motor 35.

Figure 16:
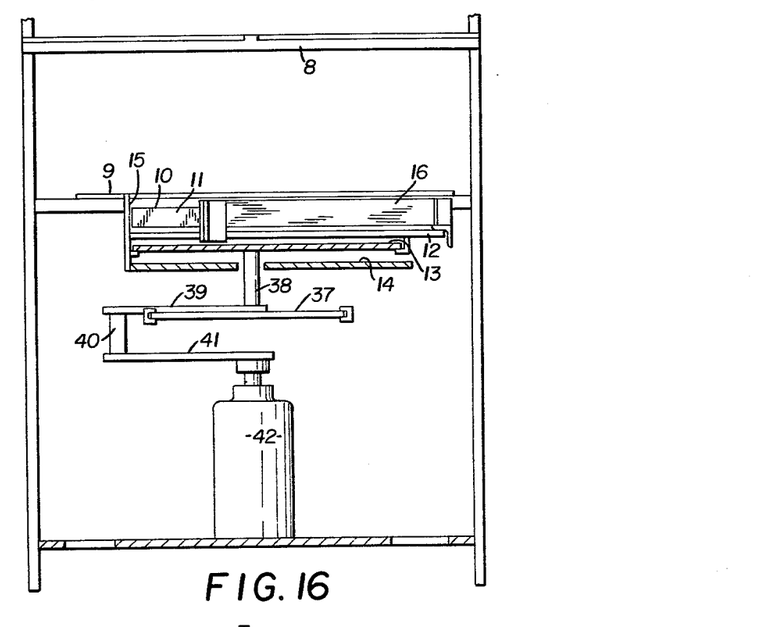
FIGURE 16 is a vertical section on line 16—16 of FIGURE 2.

By referring now to FIGURE 16 of the drawings, which is a vertical section on FIGURE 2 directed toward the right end of the machine, a plan view of the actuating mechanism for the sliding platforms 10 and 13 may be seen in greater detail. By referring thereto, it will be seen that the gear box 42 is positioned on the longitudinal center line of the can marking machine so that the crank arm 41 will revolve the pivot 40 in a desired area relative to the motion to be imparted thereby to the reciprocating member 37 which in turn is connected by the vertical member 38 to the sliding platform 13 all as heretofore described.

Figure 21:
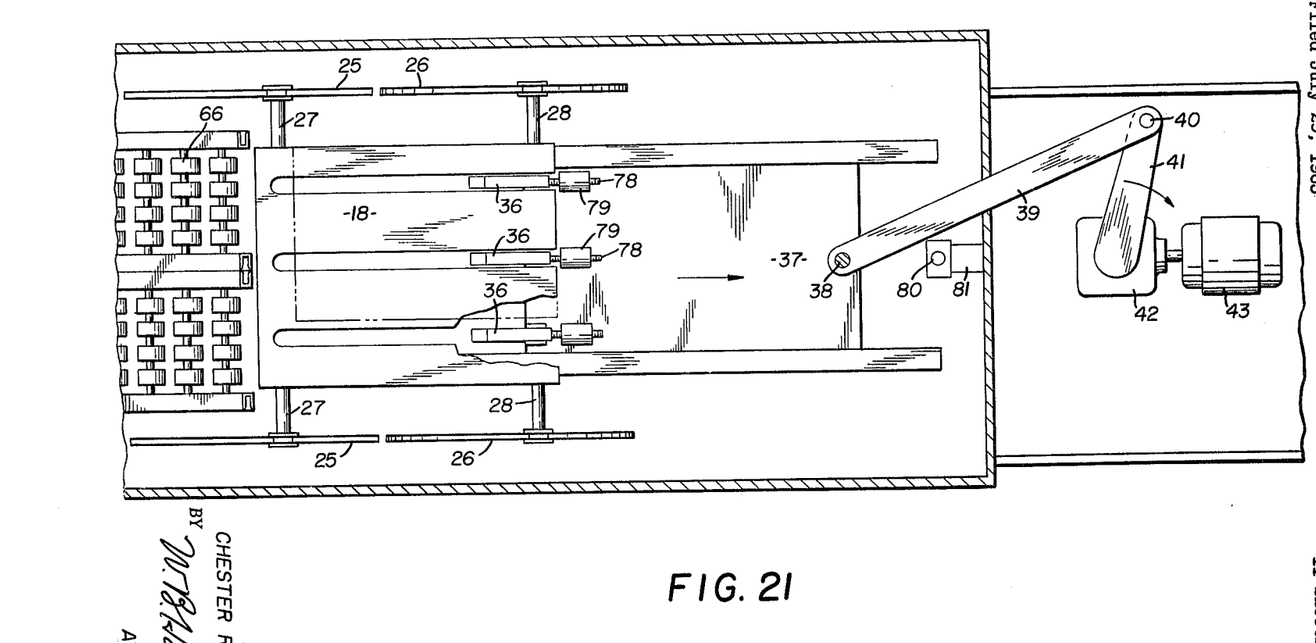
FIGURE 21 is a horizontal section on line 21—21 of FIGURE 3.

By referring now to FIGURE 21 of the drawings, a top plan view of the actuating mechanism may be seen, and it will be observed that the plurality of L-shaped arms 36 which are pivoted to the left end of the reciprocating member 37 are provided with threaded extensions 78 which adjustably position weights 79, 79 which counterbalance the L-shaped arms 36 as may also be seen by referring to FIGURES 8 and 9 of the drawings. The pivotal mounting of the L-shaped arms 36, 36 is necessary to permit their uppermost ends to move below the top of the elevator platform 18 when the same is in lower position with a carton thereon and the reciprocating member is moved to the right as seen in FIGURE 8 of the drawings.

Figure 12:
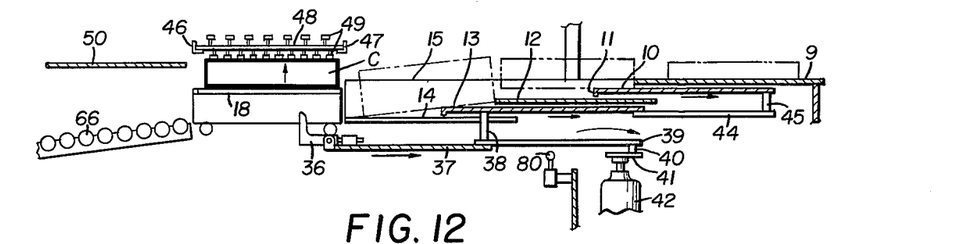
FIGURE 12 is a partial section similar to FIGURE 11 in which the elevator portion of the machine is moving the specific case into engagement with the price printing means.
Figure 13:
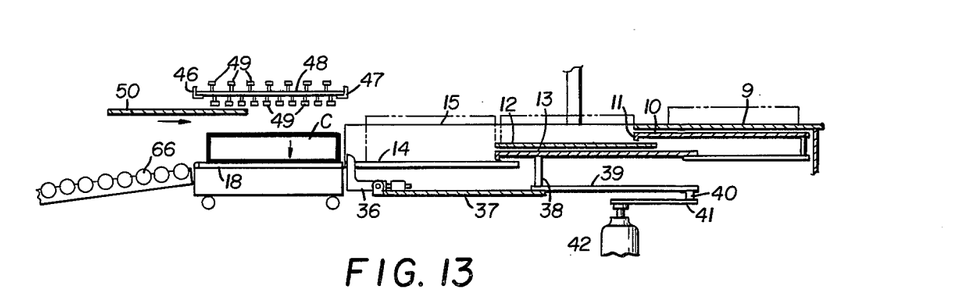
FIGURE 13 is a partial section similar to FIGURE 12 in which the elevator portion of the machine has lowered the specific case relative to the printing means.

Still referring to FIGURE 21, it will be seen that a secondary micro-switch 80 is mounted on a bracket 81 secured to the frame of the can marking machine on the axial center line of the machine and between the vertical member 38 and the gear box 42. The secondary micro-switch 80 is on the circular path of the pivot member 40 and is adapted to be engaged thereby as shown in FIGURE 11 of the drawings when the crank arm 41 moves into longitudinal relation thereto. The secondary micro-switch 80 controls the actuating motors of the can marking machine so that the motor 43 is momentarily de-energized, thus stopping the progressive motion of the sliding platforms 10 and 13 and hence stopping the motion of the carton C of cans to be marked on the elevator platform 18 and simultaneously energizing the motor 35 which actuates the cans 25 and 26 and moves the elevator platform 18 vertically. As soon as the carton C of cans to be marked is moved above the ends of the L-shaped members 36, the motion imparted by the gear box 42 resumes and the reciprocating member 37 retracts the arms 36 as seen in FIGURE 12 of the drawings. The cans upon being marked, as shown in FIGURE 12 and as heretofore described, are then lowered, as shown in FIGURE 13, and the following motion of the L-shaped arms 36 engages the carton C of marked cans and pushes them off the elevator 18 to the left as seen in FIGURES 13 and 14 and onto the conveyer 66 as seen in FIGURE 15.

It will occur to those skilled in the art that alternate mechanisms may be employed for energizing the various moving parts of the can marking machine disclosed herein. For example, pneumatic piston and cylinder assemblies may be utilized for moving the sliding platforms which advance the cartons of cans to be marked and for lifting the elevator platform by which the cartons of cans to be marked are moved into registery with the marking members. Additionally, the inking mechanism may be reciprocably moved by a pneumatic piston and cylinder assembly.

Figure 24:
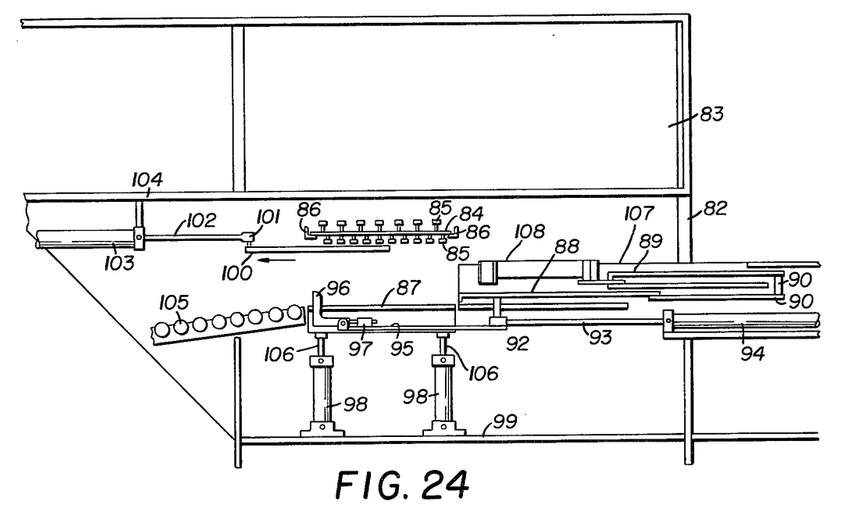
FIGURE 24 is a vertical section with parts broken away similar to FIGURE 2 and illustrating a modified means of actuating the elevator and case moving portions of the machine.

By referring now to FIGURE 24 of the drawings, such a modification may be seen in which a modified can marking machine including a frame 82 and a cabinet 83 thereabove adapted to receive a plurality of plates 84 each of which has marking members 85 thereon. The plates 84 are supported in the modified can marking machine by horizontally disposed support members 86 immediately above an elevator platform 87. A pair of sliding platforms 88 and 89 which are connected together by links 90 and 91 are arranged to be moved by a connecting member 92 on the outer end of a piston rod 93 of a piston and cylinder assembly 94 which is disposed horizonally in the machine beneath the sliding platform 89. A reciprocating member 95 is also attached to the piston rod 93 and carries a plurality of L-shaped body members 96 in pivotal relation counterweighted as at 97. The elevator platform 87 is moved vertically by a pair of piston and cylinder assemblies 98, 98 which are disposed vertically therebeneath and mounted on a horizontal member 99 of the frame 82. An inking member 100 is connected by a bracket 101 to the outer end of a piston rod 102 from a part of a pneumatic piston and cylinder assembly 103 which in turn is supported by a secondary horizontal member 104 of the frame 82 immediately beneath the cabinet 83. A conveyer 105 extends outwardly of the machine shown in FIGURE 24 and the operating cycle of the machine shown in FIGURE 24 is the same as that heretofore described in connection with FIGURES 1 through 23 of the drawings. A source of air pressure (not shown) is connected to the pneumatic cylinders 94, 98 and 103 respectively, which cylinders are double acting, and the air pressure source is controlled by suitable valves (not shown) together with a timing mechanism for actuating the same, which enables the machine to be cycled so that a carton of cans to be marked positioned initially on the platform above and to the right of the sliding platform 89 will be moved by the platforms 89 and 88 onto the elevator platform 87 where it will be moved vertically. The cans are marked and then lowered and moved off of the elevator platform 87 by the L-shaped arms 96 all as hereinbefore described.

Figure 25:
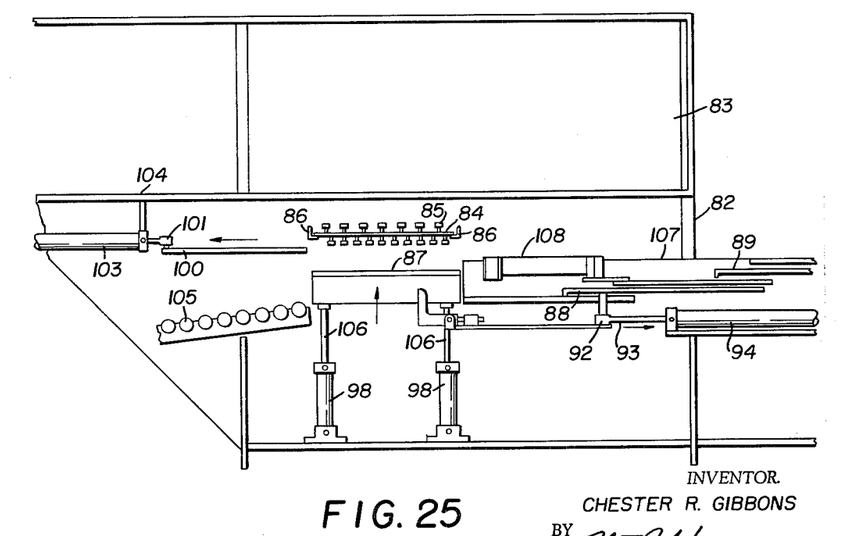
FIGURE 25 is a vertical section similar to FIGURE 24 showing a case elevating and case moving portions of the machine in advanced position relative to FIGURE 24.

In FIGURE 25 of the drawings, the pneumatic cylinders 98 are shown elevating the elevator platform 87 which is supported on the ends of piston rods 106 which slidably engage the cylinders 98. In FIGURE 25, the inking member 109 is shown moved to retracted position and the sliding platforms 88 and 89, both of which are flanged at their lefthand ends so as to better engage the cartons of cans to be marked, are shown in partly retracted position whereas in FIGURE 4 the sliding platforms are shown in fully extended position. The modified machine of FIGURES 24 and 25 has a back guide wall 107 and includes the spring guide 108 which functions in exactly the same manner as the spring guide 16 heretofore referred to. If desired, a pneumatic piston and cylinder assembly may be added to the spring guide 108 to insure its positive positioning of the carton of cans to be marked.

It will thus be seen that a can marking machine has been disclosed which will accept various sized cases of cartons of canned goods to be marked and which cases or cartons may be of various sizes and shapes and have varying numbers of cans therein and that the machine will progressively move the cartons of cans to be marked into a marking area by two series of uniquely arranged sliding platforms which progressively advance the carton of cans to be marked one step at a time and finally position the said carton of cans to be marked on an elevator platform which in turn is moved vertically to engage a plurality of resiliently mounted indicia printing members which are carried on a plate temporarily disposed horizontally in the can marking machine.

The machine provides storage for a sufficient number of such plates and their indicia marking members as to enable all sizes of cases and cans to be marked with the desired prices. The marking devices are automatically inked prior to each marking operation by a uniquely arranged inking member which slides horizontally beneath the marking members and rises vertically to apply the ink in a wiping vertical motion and then immediately lowers and retracts. The machine is simple in its construction and operation. The three essential operating portions thereof, the sliding platforms for feeding the cartons, the elevator platform for lifting the cartons of cans to be marked and the inking mechanism are simply and efficiently formed and may be very easily arranged for automatic cycling by interconnecting electrical switches such as disclosed and arranged to control the three electric motors as shown in the preferred embodiment of the invention.

The machine is so designed that the inexperienced stockboys in a supermarket may efficiently operate the machine to mark opened cases of canned goods, boxes, packages and various other forms of merchandise by simply interchanging the plate carrying the marking indicia.

It will thus be seen that a marking machine of a simple and practical nature and meeting the several objects of my invention has been disclosed and having thus described my invention, what I claim is:

1. A can marking machine for marking cans in open top cartons and comprising a feeding section, a marking section and a delivering section, said feeding section including at least one stationary platform for receiving cartons of cans to be marked and a reciprocably mounted sliding platform adjacent said stationary platform, said sliding platform arranged to push cartons of cans to be marked away from said stationary platform, an elevator platform adjacent said stationary platform in a position to receive cartons of cans pushed away from said stationary platform and means for moving the elevator platform vertically in a reciprocal movement, an indicia carrying device removably positioned in said machine above said elevator platform for registry with said carton of cans to be marked when said elevator platform moves the same upward thereagainst and ejecting means movable relative to said elevator platform arranged to engage said carton of marked cans on said elevator platform and move the same away therefrom and a source of reciprocal movement in said machine connected with said sliding platform and ejecting means for imparting movement thereto.

2. The can marking machines set forth in claim 1 and wherein said feeding section comprises two stationary platforms spaced horizontally and vertically with respect to one another, the lower one of which is adjacent said elevator platform, and two reciprocably mounted sliding platforms one positioned above and in back of said lower stationary platform and the other positioned above and in back of the other of said stationary platforms, means interconnecting said sliding platforms and means for moving the same.

3. The can marking machine set forth in claim 1 and wherein a reciprocating member and links positioned in said machine below said stationary platform interconnect said reciprocably mounted sliding platform and said ejecting means with said source of reciprocal movement.

4. The can marking machine set forth in claim 1 and including a reciprocating member positioned in said machine adjacent said stationary platform and wherein said ejection means comprises a plurality of L-shaped members pivoted to said reciprocating member and disposed in spaced longitudinally extending slots in said elevator platform.

5. The can markin machine set forth in claim 1 and wherein inking means is arranged for inking said indicia carrying device, said inking means comprising a horizontally disposed reciprocably mounted inking pad and frame therefor positioned in said machine at one side of said marking section and means for moving the same horizontally relative to said indicia carrying device said means including links supporting said inking pad relative to said frame arranged to move said pad vertically relative to said frame.

6. The can marking machine set forth in claim 1 and wherein horizontally disposed guides are positioned in said machine for supporting said indicia carrying device, spring urged detents in said guides for holding said member, said device being movable relative to said spring urged detents upon excessive vertical movement of said elevator platform, a control switch on one of said horizontal guides arranged to reverse the operation of said machine upon the engagement of said carton of cans thereagainst.

7. In a can marking machine, a carton moving device comprising a fixed platform, a pair of slidable platforms positioned one above and behind said fixed platform and one below and in front of said fixed platform, a flange on one of the transverse edges of each of said sliding platforms, means interconnecting said sliding platforms for imparting simultaneous movement thereto, the flange on the sliding platform above the fixed platform being closely spaced relative thereto, said last-mentioned sliding platform being movable substantially across said fixed platform.

8. In a can marking machine, an indicia marking device and inking device therefor, said inking device comprising a rectangular ink pad, a rectangular frame therefor, links pivotally connecting the corners of said pad to the corners of said frame, said pad normally resting on said frame with one end of said pad extending outwardly of said frame, an abutment in said machine outwardly of said frame, and means for imparting reciprocating movement to said frame arranged to move said pad into engagement with said abutment to cause said links to elevate said pad relative to said frame as said frame continues to move so as to contact said indicia marking device.

9. A can marking machine for marking cans in open top cartons and comprising a feeding section, a marking section and a delivery section, said feeding section having reciprocal conveyer means for engaging and moving said cartons of cans into said marking section, said marking section having reciprocal elevator means for lifting said cartons of cans and a plurality of interchangeable indicia carrying members one of which is removably located above said elevator means, each of said indicia carrying members having resilient indicia portions positioned therebelow, said delivery section having reciprocal delivery members movable horizontally relative to said conveyer means for moving said cartons of cans out of said marking section and means for imparting reciprocal movement to said conveyer means, elevator means and delivery members.

References Cited by the Examiner
UNITED STATES PATENTS

| | | | |
|---|---|---|---|
| 190,148 | 5/77 | Koenig | 101—287 |
| 1,144,340 | 6/15 | Campbell | 101—316 |
| 1,420,187 | 6/22 | Douglas | 101—44 |
| 1,427,843 | 9/22 | Pogue | 101—43 |
| 1,731,834 | 10/29 | Wheeler | 101—287 |
| 1,820,010 | 8/31 | Cogswell | 101—43 |
| 1,928,715 | 10/33 | Wilson | 101—379 |
| 2,005,787 | 6/35 | Humphrey | 101—114 |
| 2,014,372 | 9/35 | Brickell | 101—114 |
| 2,090,919 | 8/37 | Strother | 101—37 |
| 2,271,914 | 2/42 | Deane et al. | 101—287 |
| 2,904,916 | 9/59 | Stahmann | 101—35 |
| 3,094,920 | 6/63 | Priesmeyer | 101—41 |

EUGENE R. CAPOZIO, *Primary Examiner.*